(12) United States Patent
Hope (10) Patent No.: US 6,499,678 B1
(45) Date of Patent: Dec. 31, 2002

(54) SHUT-OFF MECHANISM FOR SPRINKLERS

(76) Inventor: Donald A. Hope, 14576 6th Court North, Loxahatchee, FL (US) 33470

( * ) Notice: Subject to any disclaimer, the term of this patent is extended or adjusted under 35 U.S.C. 154(b) by 0 days.

(21) Appl. No.: 09/712,494

(22) Filed: Nov. 14, 2000

(51) Int. Cl.[7] .......................... B05B 1/30; B05B 15/10; B05B 1/00; A01G 25/06
(52) U.S. Cl. .................. 239/581.1; 239/201; 239/203; 239/204; 239/600
(58) Field of Search .............................. 239/569, 581.1, 239/587.1, 587.4, 537, 538, 600, 393, 201, 203, 204, 205; 251/149.8, 149.9

(56) References Cited

U.S. PATENT DOCUMENTS

| | | | | |
|---|---|---|---|---|
| 1,336,123 A | * | 4/1920 | Barnes | 251/149.8 |
| 4,078,726 A | * | 3/1978 | Walto | 239/201 |
| 4,562,962 A | * | 1/1986 | Hartman | 239/200 |
| 4,736,889 A | * | 4/1988 | Stephenson | 239/204 |
| 4,848,661 A | * | 7/1989 | Palmer et al. | 239/204 |
| 5,524,824 A | * | 6/1996 | Frimmer | 239/71 |
| 5,762,270 A | * | 6/1998 | Kearby et al. | 239/242 |
| 6,000,632 A | * | 12/1999 | Wallace | 239/570 |
| 6,202,678 B1 | * | 3/2001 | Hawkins | 137/460 |

* cited by examiner

*Primary Examiner*—Michael Mar
*Assistant Examiner*—Davis Hwu
(74) *Attorney, Agent, or Firm*—Norman Friedland (57) ABSTRACT

The combination of a case enclosed sprinkler and shut-off valve having the dual function of shutting off the flow of water to a case enclosed sprinkler so that case enclosed sprinkler can be removed from the case enclosed sprinkler system or zone for replacement, repair, maintenance and the like and the insertion and removal of the case enclosed sprinkler operates to open and close the shut-off valve. The shut-off valve has infinite settings so that it can be utilized as a metering valve to limit the flow of water entering the case enclosed sprinkler. In another embodiment, an adapter mechanism can be utilized in combination with the shut-off valve to obtain water from the system when desired.

14 Claims, 10 Drawing Sheets

SHUT-OFF MECHANISM FOR SPRINKLERS

TECHNICAL FIELD

This invention relates to valve mechanism and more particularly to a shut-off valve for an in-ground sprinkler system that is typically utilized to water or irrigate lawns and the like.

BACKGROUND OF THE INVENTION

As is well known to those skilled in the irrigation system technology, sprinkler systems as utilized to irrigate and water lawns, golf courses, athletic fields, and the like and comprise typically in-ground sprinklers that are of the type that are embedded into the ground and pop-up when deployed or rest above the ground and are connected to a water source and are grouped in zones. Typically, an activating system automatically turns the system on and water is directed to one or more zones that comprise a plurality of individual sprinklers. As is well known in the repair or maintenance of each of the sprinklers, the operator has to either work on an individual sprinkler in a given zone with the water on or alternatively, shut-off the system in that zone in order to repair or maintain or replace an individual sprinkler. Obviously, shutting off the water by turning the system or zone on and off is cumbersome and time consuming since the controls are usually remote from the sprinkler being worked on and requires several trips to the remotely mounted shut-off control or valve. At times, two people are required to perform this function, one for controlling the on/off of the water and the other doing the repair.

I have found that I can obviate this problem noted in the immediate above paragraphs, by including a valve at each of the sprinklers and by virtue of and in accordance with this invention the removal of the sprinkler or sprinkler head turns the valve to the closed position and the insertion of the sprinkler or sprinkler head turns the valve to the on position. Thus, the operator merely has to remove the sprinkler while the system is in the "on" position and while water is flowing to the sprinklers in the zone and the valve of my invention will turn the water off of that individual sprinkler so that the repair, replacement or maintenance can be performed. After the work is completed the sprinkler is returned and screwed into the shut-off valve which is attached to the piping and the shut-off valve of my invention is automatically turned on.

An option that is provided with the shut-off valve is that since the shut-off valve has infinite positions and hence, can change the flow area, the shut-off valve can be utilized as a metering valve to limit the amount of water flow into the sprinkler and hence, in a sense, control the flow out of the sprinkler. This affords the advantage of regulating the output of the sprinkler where in situations the throw of the water emitted from the sprinkler is further than is desired and needs to be shortened. This is accomplished by adjusting the shut-off valve to a position that is less than full opened.

An adapter is contemplated by this invention which serves to turn on and off the sprinkler and can be utilized to provide water at the cite where it be used for cleaning purposes or to connect a hose thereto to provide water in nearby locations.

SUMMARY OF THE INVENTION

An object of this invention is to provide a valve mounted to the sprinkler in the water line that is capable of shutting off the flow of water when the sprinkler is removed and allowing the flow of water water when the sprinkler is inserted into the line via the shut-off valve.

A feature of this invention is the combination of a sprinkler and shut-off valve where the shut off valve includes infinite settings to vary the flow area to limit the flow of water being delivered to the sprinkler.

Another feature of this invention is the design of the shut-off valve so that it is utilized in an in-line water line that permits the flow of water to sprinklers mounted downstream thereof or where the shut-off valve is mounted on an individual sprinkler that does not flow water to a downstream sprinkler.

Another feature of this invention is to provide an adapter and shut-off valve combination that shuts-off the flow of water when mounted in the place of a sprinkler and opens the shut-off valve to provide the flow of water for uses other than the normal sprinkling systems's use.

The foregoing and other features of the present invention will become more apparent from the following description and accompanying drawings.

DETAILED DESCRIPTION OF THE INVENTION

These figures merely serve to further clarify and illustrate the present invention and are not intended to limit the scope thereof While this invention is described utilizing a pop-up type of sprinkler as will be understood by those skilled in this technology, this invention has utility with most of the other types of sprinklers which include those manufactured by The Toro Company, K-Rain Manufacturing Corporation, Rainbird and others. In general, the oscillating sprinklers are closed encased with an oscillating pop-up member that oscillates by either gearing to reverse the direction of the sprinkler or stators that reverse the direction of the sprinklers, and the pop-up type of sprinkler (non-oscillating) merely is deployed to extend from the casing when it is used to irrigate. As one skilled in this art will appreciate, this invention can also be utilized with the type of sprinkler that is mounted so that it extends beyond the ground without the capability of being deployed. The significance of this invention is the ability to shut-off the water flow from a sprinkler to allow a worker to perform maintenance or the removal of the sprinkler without having to shut-off the entire system or a zone of the system. In another embodiment of this invention, an adapter mechanism in combination with the shut-off valve connects to the pipe so as to be capable of providing water through the shut-off valve for use for other purposes.

As used herein sprinklers, whether of the pop-up, oscillating, gear driven or stator driven and the like are referred to herein as case-encased sprinklers or sprinklers. The sprinklers to which this invention is of particular importance is sprinklers that are installed in a sprinkler system that may or may not include zones.

The invention is best understood by referring to FIGS. 1–7 that show a closed-encased sprinkler generally illustrated by reference numeral 10 mounted in the ground and attached to the threaded member 12 of shut-off valve 14. The sprinkler 10 includes a pop-up member 16 that extends beyond the surface of the ground when deployed and is typically spring-loaded in the retracted position and the pressure of the water forces the pop-up member in the extended position when the water is turned on. Shut-off valve 14 includes suitable fittings to connect to the sprinkler 10 and the pipe 18 of the sprinkler system which may be one of a plurality of sprinklers connected to pipe 18 to constitute a zone of the system or in a smaller installation only a single zone would be utilized.

Figure 1:
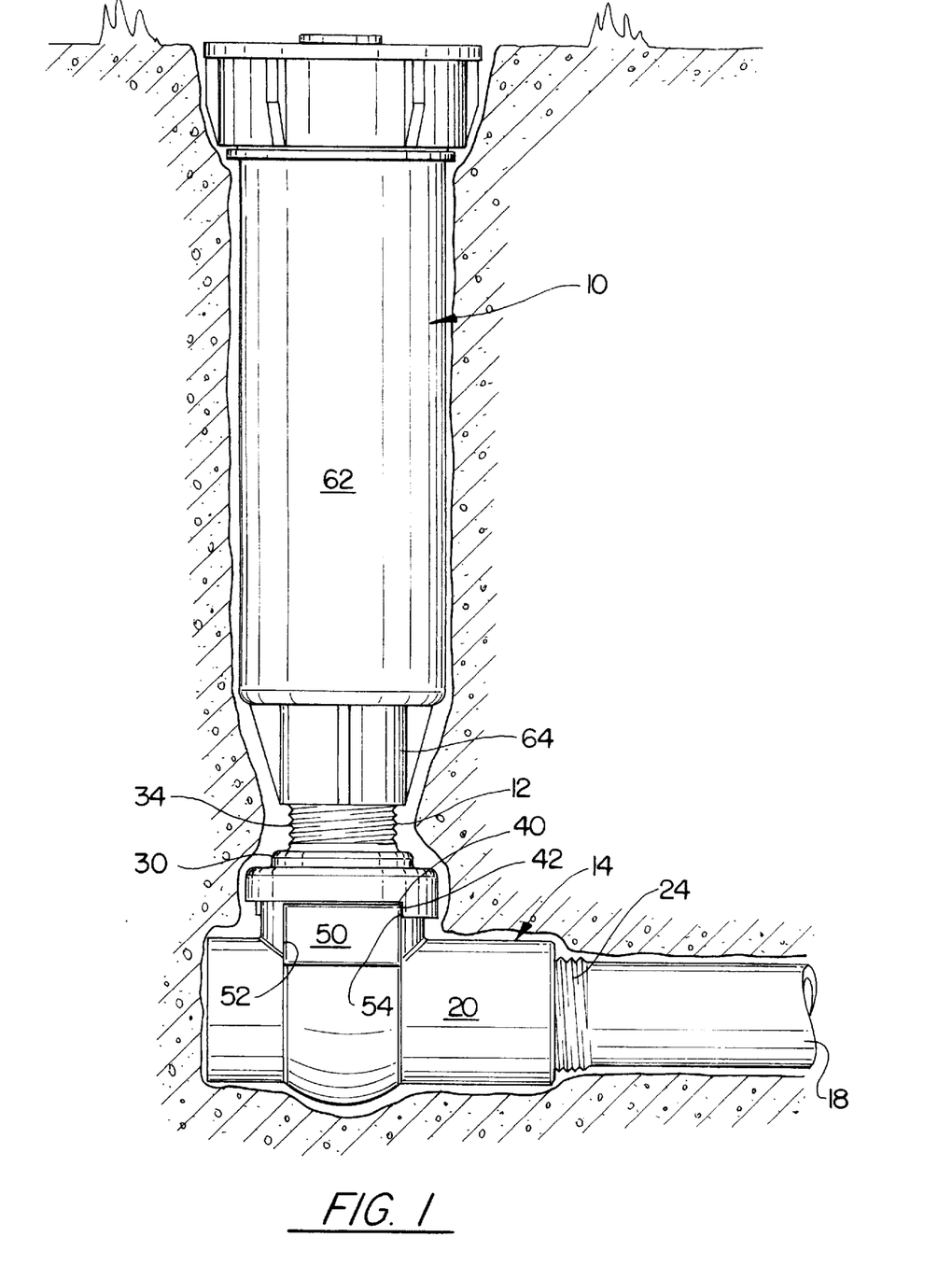
FIG. 1 is a full view in elevation showing a closed-encased sprinkler mounted in a sprinkler system incorporating this invention.
Figures 2A, 2B:
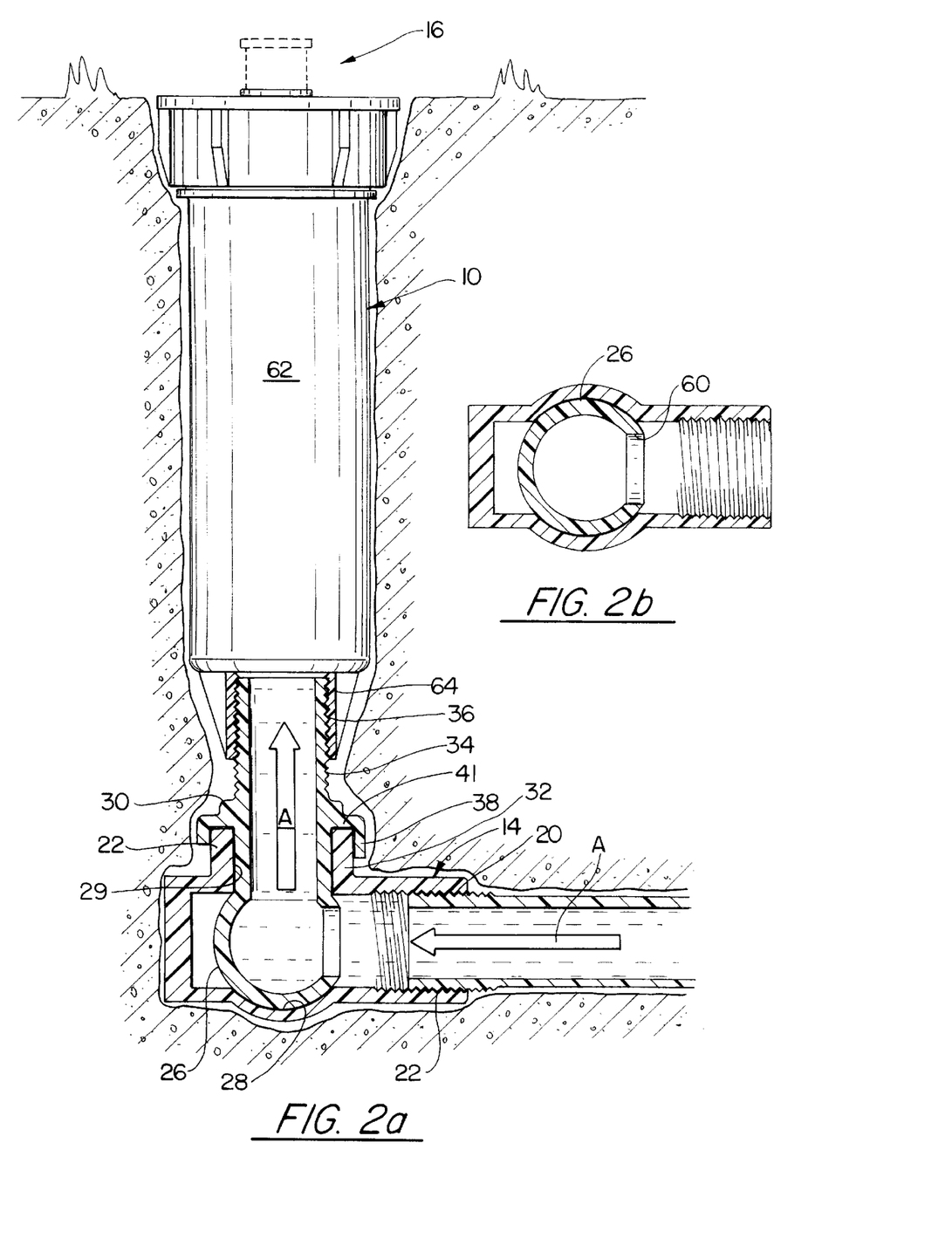
FIG. 2a us a view in elevation and partly in section of the sprinkler system depicted in FIG. 1 with the shut-off valve in the opened position.
FIG. 2b is a partial view in section of the shut-off valve of this invention in the opened position.
Figures 3A, 3B:
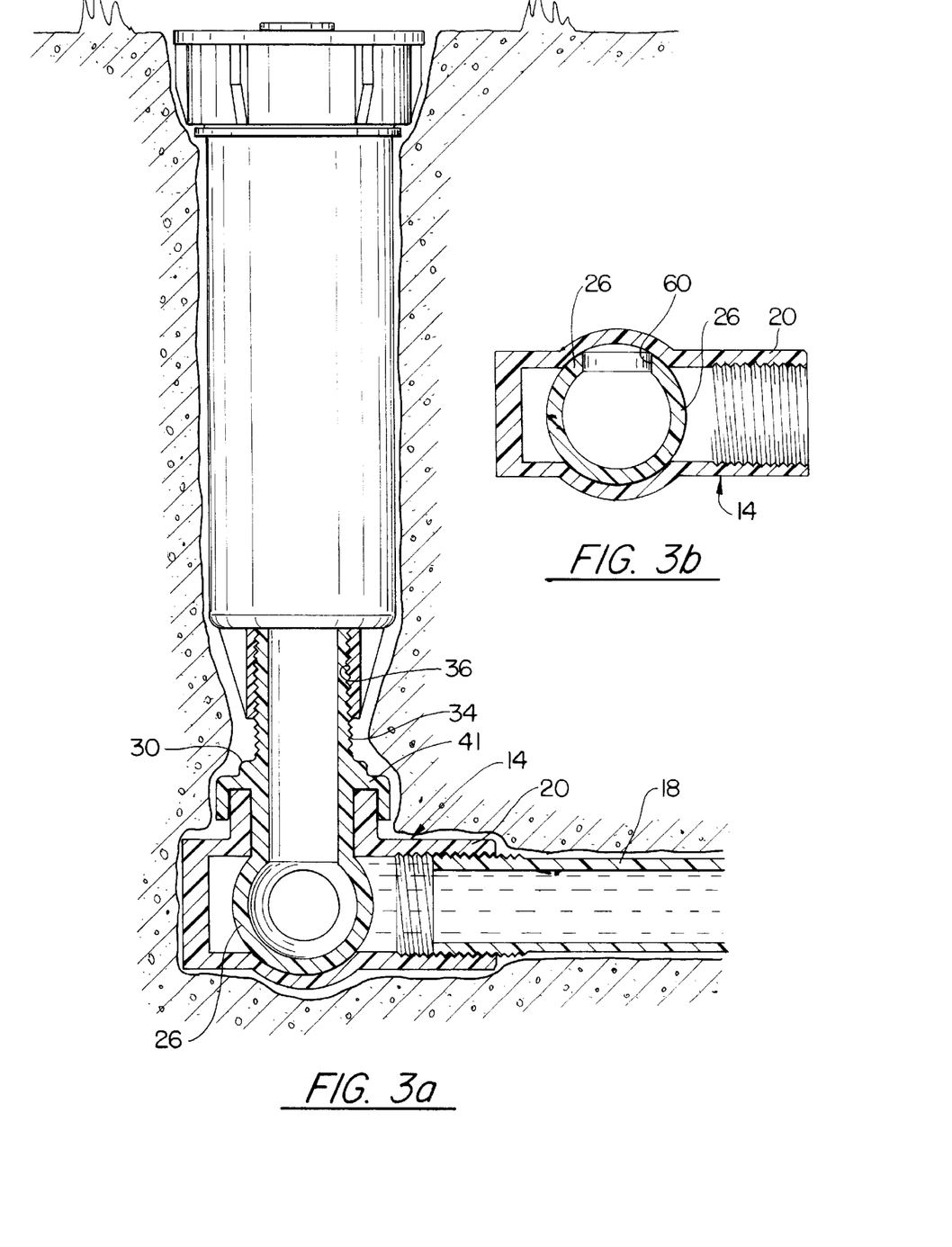
FIG. 3a is a view in elevation and partly in section of the sprinkler depicted in FIG. 1 with the shut-off valve in the closed position.
FIG. 3b is a partial view in section of the shut-off valve in the closed position.

As seen in FIGS. 2a and 2b, shut-off valve 14 includes a main housing 20 that includes the threaded portion 22 that attaches to the complementary threads 24 formed at the end of pipe 18. The shut-off valve 14 includes a rotary valve portion 26 configured in a spherical or hollow ball shape that is rotatably mounted in the complementary shaped cavity 28 defined by housing 20. The hollow stem 30 extends from the valve portion 26 through the bore 28 formed in boss 32 of housing 20 and carries a threaded portion 34 that engages the complementary threaded portion 36 formed on the bottom end of the sprinkler. The hollow central portion of valve stem 30 aligns with the sprinkler so as to be in fluid communication therewith when the shut-off valve is positioned open. According to this invention, the valve stem 30 includes flange 41 that carries a downwardly extending lug portion 38 that defines shoulder 40 that includes a face 42 (FIG. 1) and shoulder 44 that includes face 46 (FIG. 6) that engage the opposite ends of the stop member or projection 50 that projects outwardly from the housing 20. Stop member 50 carries opposite edges 52 and 54 that serve to stop the rotation of the valve stem 20 as will be described in further detail hereinbelow.

As is apparent from the foregoing, when the valve stem 30 is rotated in one direction, say clockwise, the face 42 of the shoulder 40 (FIG. 1) will abut against face 54 of stop member 50 to prevent further rotation of the valve stem 30. In this position the valve portion 26 is oriented so that the aperture 60 aligns with the pipe or tubing 18 to flow water (arrow A) into the sprinkler. Rotation of valve stem 30 in the opposite direction (counter clockwise) rotates aperture 60 out of alignment with the pipe 18 and obviously, shuts-off the flow of water from the sprinkler. In accordance with this invention, it also becomes apparent that since the sprinkler 10 is affixed to the valve stem 30 via the complementary threads 34 and 36, rotation of the sprinkler casing 62 which carries the threads 36 via the depending leg 64 will cause the valve stem 30 to rotate the valve member 26 to either shut-off or turn on the flow of water. Further rotation of the sprinkler casing 62, which is relative to the now stationary valve stem 30, will remove the disengaged the threads 36 from the threads 34 for removal of the sprinkler. Obviously, rotation of the sprinkler casing 62 in the counterclockwise direction serves to provide the dual function of rotating the valve portion 26 to shut-off the flow of water and permit the removal of the sprinkler 10. Likewise, inserting the sprinkler to rethread it back to the assembled condition, the sprinkler casing would be rotated in the clockwise direction. Once the sprinkler is threaded to allow the torque occasioned by the rotation of the sprinkler casing 62 to overcome the friction of the valve member 26, the continuing of the rotation of the sprinkler casing 62 will cause the valve stem 30 to rotate to, in turn, rotate the valve member 26 so that aperture 60 aligns with the tubing 18 to return the flow of water to the sprinkler 10. Hence, simply by rotating the sprinkler housing 62 to either the clockwise or counterclockwise directions serves to install the sprinkler to the sprinkler system and align the shut-off valve to permit flow of water to the sprinkler and conversely, serves to remove the sprinkler and shut-off the flow of water from the sprinkler. Obviously, the installation can be designed where the reverse is true, namely clockwise rotation will remove the sprinkler and counterclockwise rotation will assemble the sprinkler.

Figure 7A:
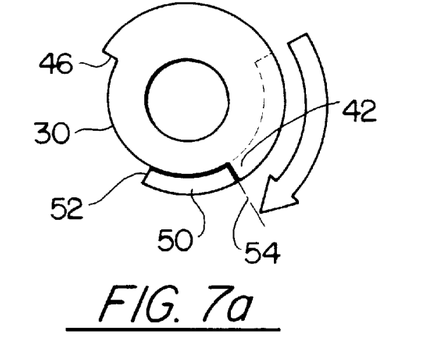
FIG. 7a is a schematic view of the shut-off valve of this invention illustrating the stops for shutting and opening the valve when the sprinkler is removed or installed.
Figure 7B:
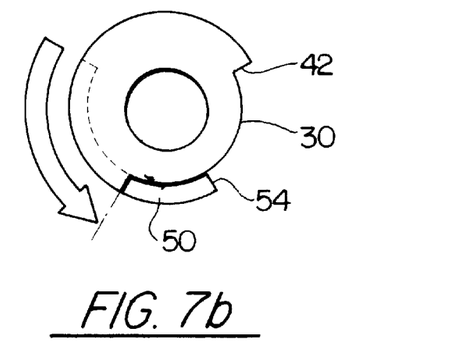
FIG. 7b is identical to the schematic depicted in FIG. 7a where the rotation of the sprinkler is turned in the opposite direction.

FIGS. 7a and 7b best illustrate the stop mechanism of this invention. When the valve stem 30 is rotated clockwise (FIG. 7a) the face 42 abuts against the edge 54 of the stop member 50 and when the stem is rotated counterclockwise the face 46 abuts against the edge 52 of stop member 50 (FIG. 7b).

Figure 4:
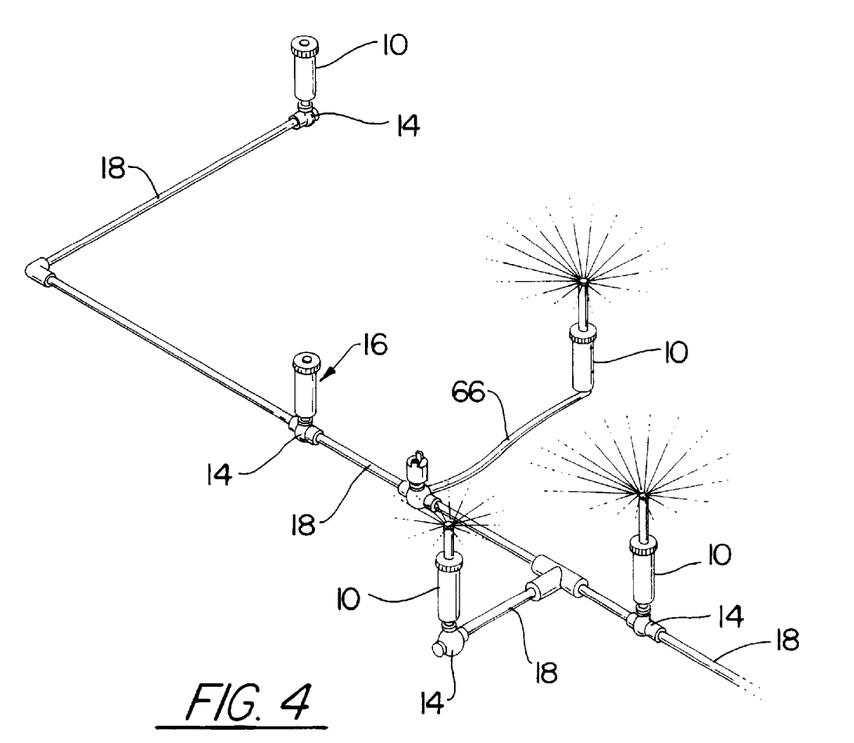
FIG. 4 is a schematic view in perspective illustrating a zone in a sprinkler system employing the present invention.
Figure 8:
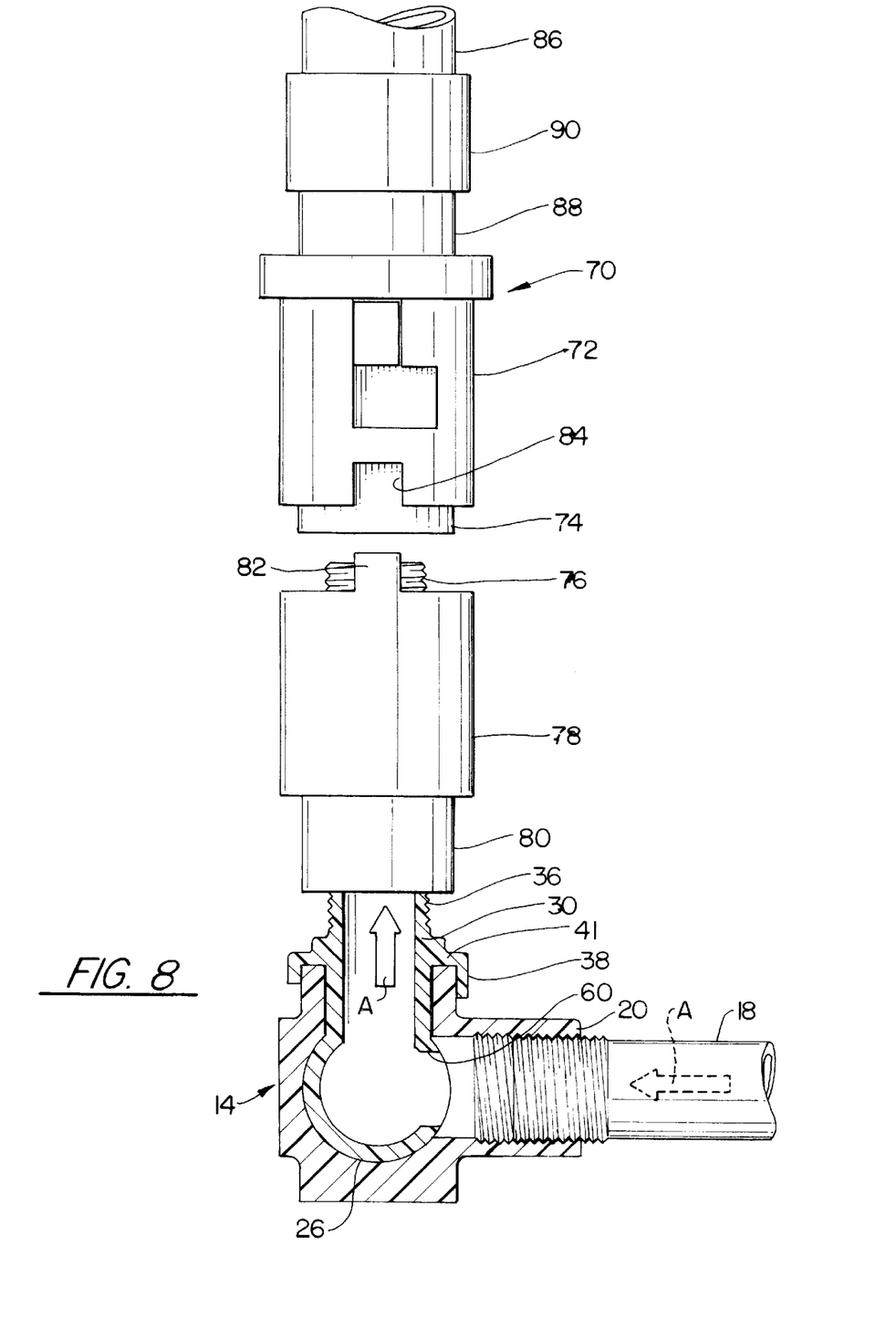
FIG. 8 is a view in elevation and partly in section and partly exploded exemplifying another embodiment of this invention consisting of the combination of an adaptor and shut-of valve utilized in the sprinkler system to flow water for purposes other than the purpose of the sprinkler system.
Figure 9:
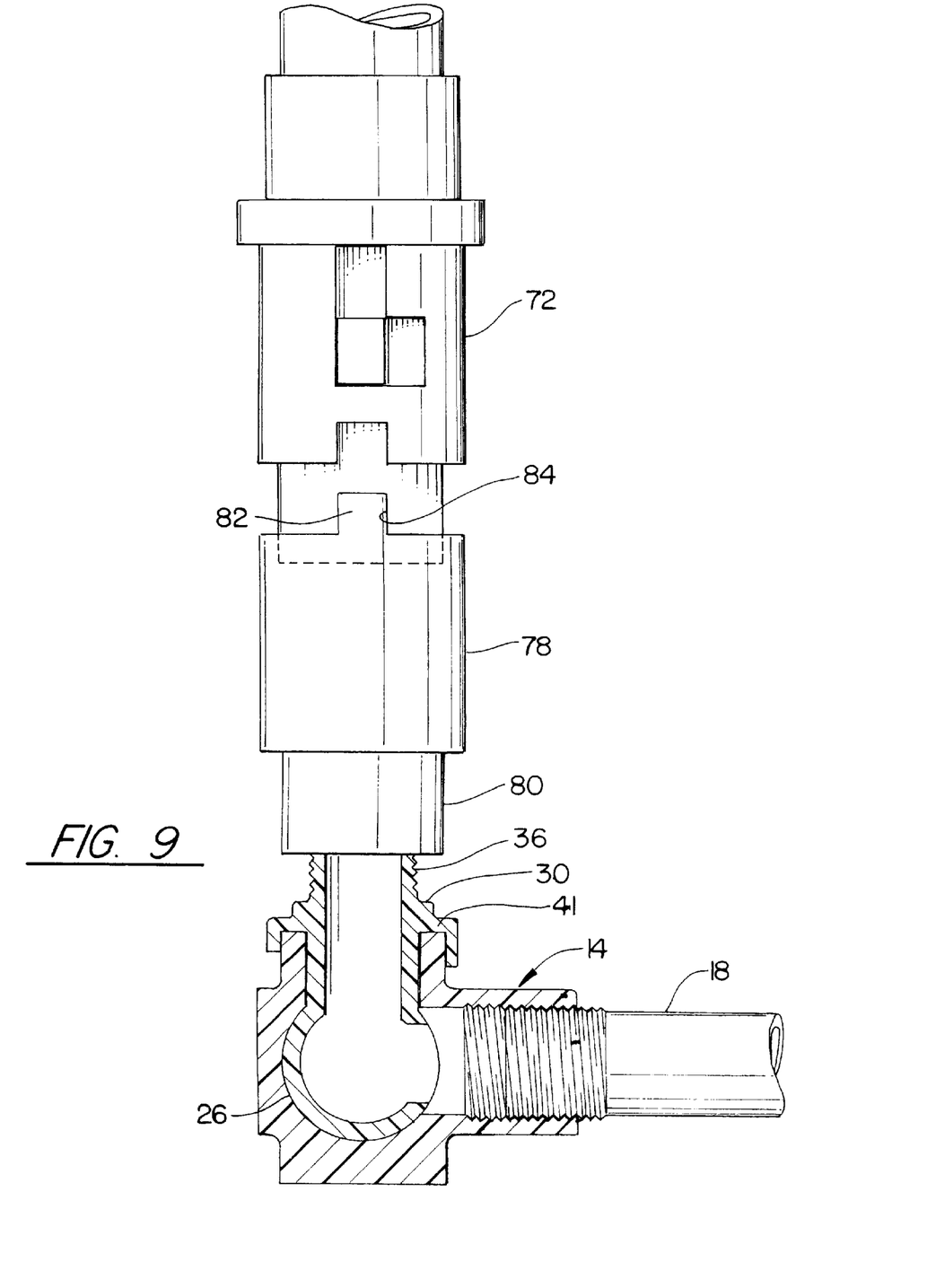
FIG. 9 is a view of the embodiment depicted in FIG. 8 with the unit assembled and the clutch of the adaptor being disengaged.
Figure 10:
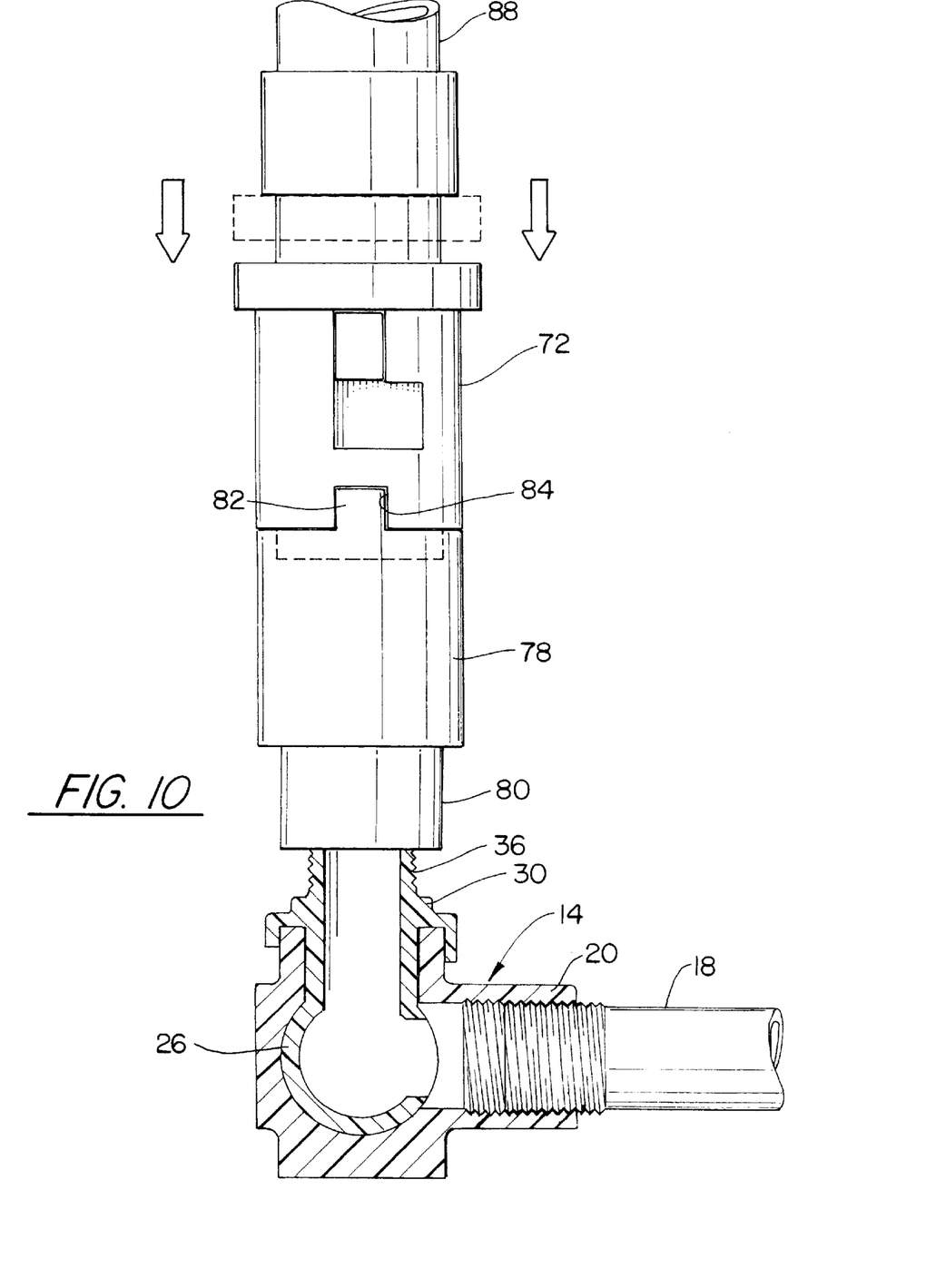
FIG. 10 is view of the embodiment depicted in FIG. 8 with the clutch being engaged and the shut-off valve being in the opened position.
Figure 11:
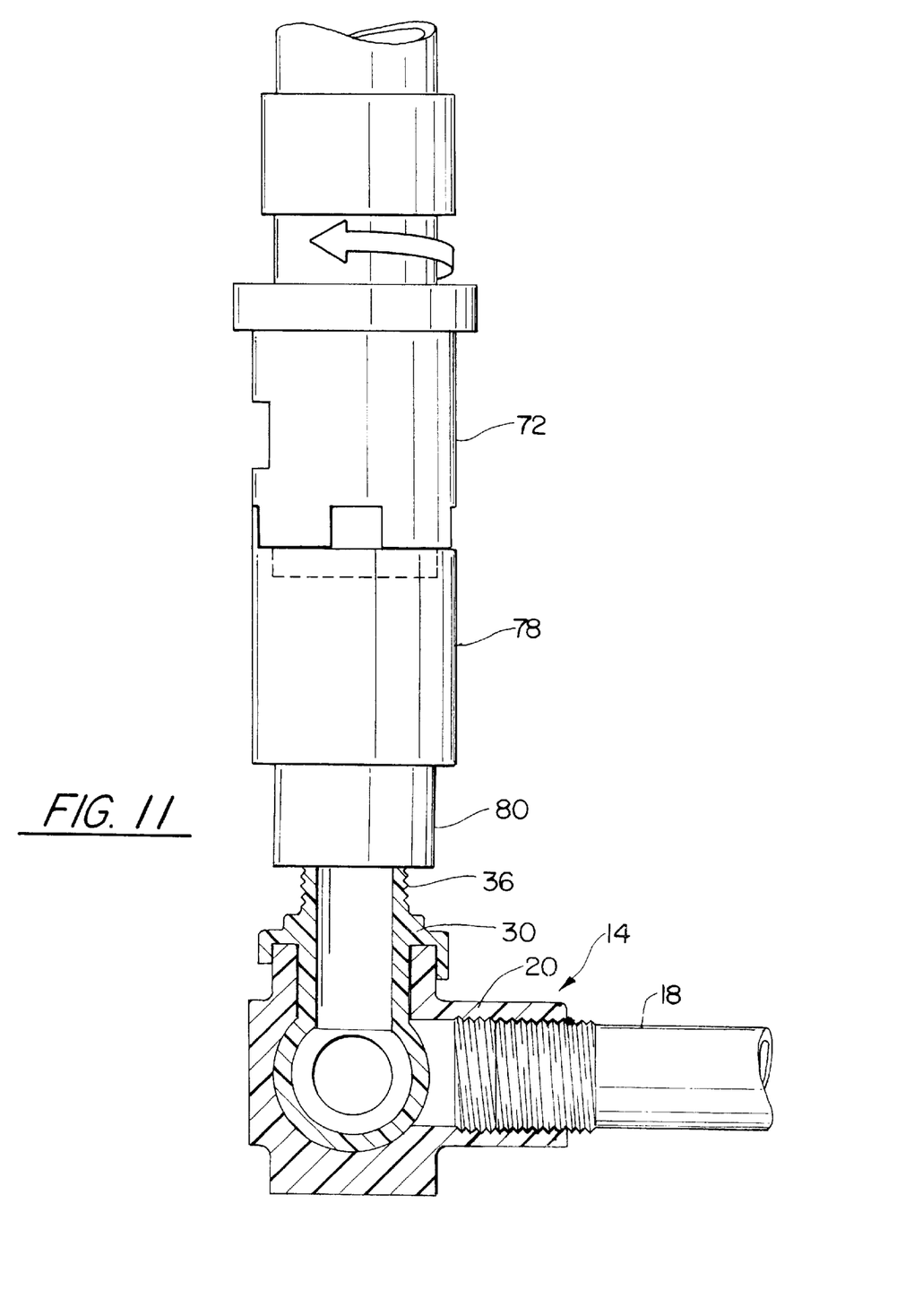
FIG. 11 is a view of the embodiment depicted in FIG. 8 with the adapter rotating the shut-off valve to the closed position.
Figure 12:
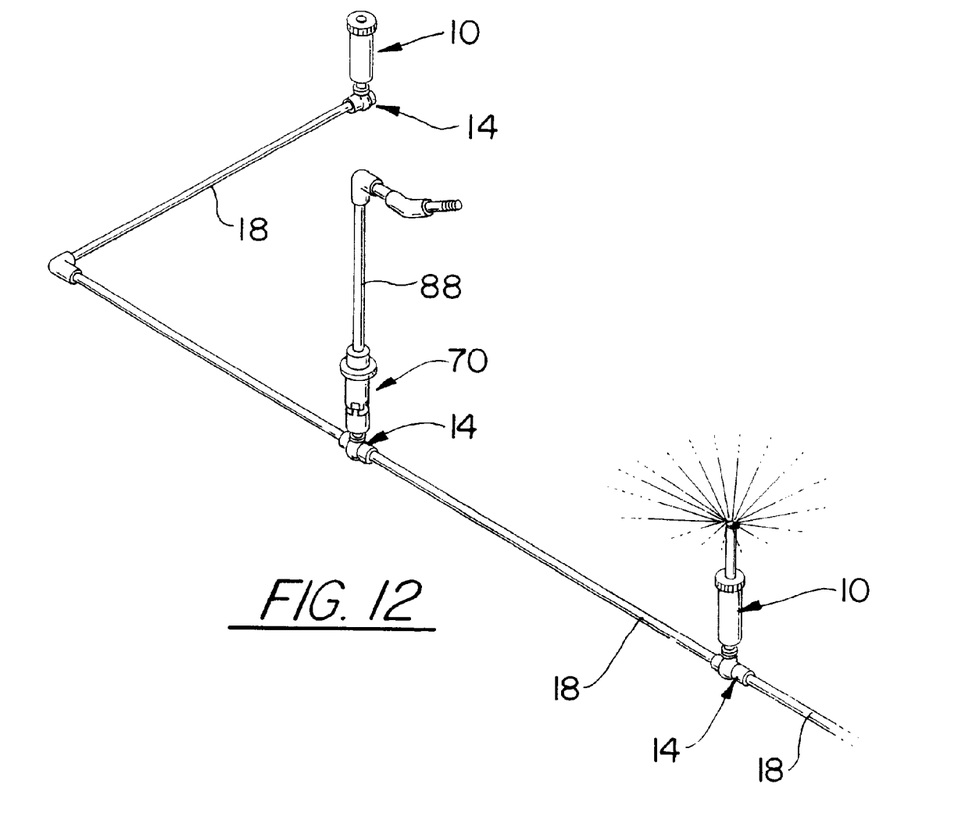
FIG. 12 is a view partly in schematic and partly in perspective illustrating the adaptor/shut-off valve configuration assembled in a sprinkler system.

In a commercially available sprinkler systems or zone(s) of commercially available sprinkler systems, as illustrated in FIGS. 4 and 8, optionally, each of a plurality of commercially available sprinklers are connected to the commercially available pipes 18 via the shut-off valve 14 of this invention. Obviously, the sprinklers that are connected to the pipe 18 are mounted in series so that the shut-off of flow from an upstream sprinkler would also shut-off the flow of water to a downstream sprinkler. As best seen in FIG. 4, the sprinkler system or zone may also be connected in parallel as shown by the short pipe 18 or the sprinkler my be connected by using the commercially available funny connector 66. The funny connector 66 is merely a flexible tube with adequate commercially available fittings that interconnects the pipe 18 to the sprinkler 10. Similar to the connections shown in the installation of the sprinklers 10 connected to pipe 18, the sprinkler 10 connected to the funny connector 66 could also be mounted to the shut-off valve of this invention and would operate in the same manner as was described above. As one skilled in this art will appreciate, for the sake of economy a single shut-off valve could be utilized to shut off the flow of water instead of a number of sprinklers mounted in proximity to the sprinkler that includes the shut off valve. Hence, the operator merely has to shut-off the upstream sprinkler and this will shut-off the downstream sprinklers allowing the operator to work on any of the downstream sprinklers.

Figure 5:
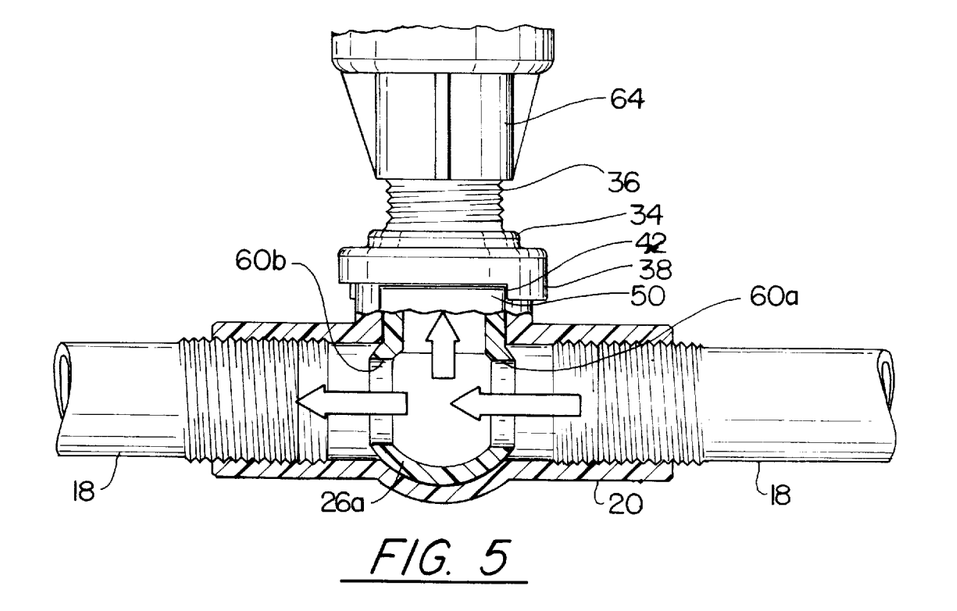
FIG. 5 is a fragmentary view partly in section illustrating this invention in a series connection in a sprinkler system with the shut-off valve in the opened position.
Figure 6:
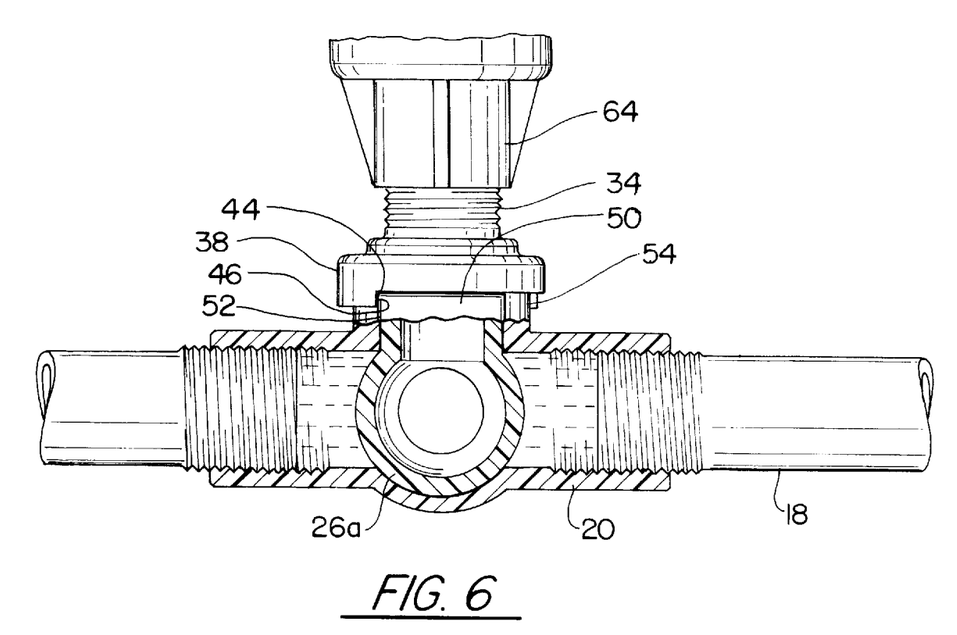
FIG. 6 is a view identical to the valve of this invention depicted in FIG. 5 with the shut-off valve in the closed position.

FIGS. 2a, 2b, 3a and 3b illustrate an embodiment where the sprinkler is at an end in a series of sprinklers or is connected to a funny connector. FIG. 5 illustrate an embodiment where the sprinkler is connected in line so as to deliver water to a downstream mounted sprinkler. In this embodiment, valve member 26a is formed with a pair of apertures 60a and 60b to flow the water through the hollow valve member 26a. FIG. 6 illustrates the embodiment depicted in FIG. 5 where the valve member 26a is in the shut-off position. (The same reference numerals depict the same or similar parts in all of the Figs.)

FIGS. 8–12 illustrate the embodiment of the combined adapter mechanism and shut-off valve so that the removed sprinkler from a shut-off valve can be utilized for other purposes. Adapter mechanism generally illustrated by reference numeral 70 includes an upper cylindrically shaped hollow member 72 that rotatably supports the hollow cylindrical fitting 74. The inner diameter at the bottom end is threaded to engage the threads 76 formed on the upper end of the bottom cylindrically shaped hollow member 78. The depending leg 80 includes inner threads (not shown) similar to the member 64 (FIGS. 1 and 2) that engage the complementary threads 34 of stem 30. Tangs 82 extending upwardly from the peripheral surface of member 78 engages the detentes 84 formed in the bottom peripheral surface of member 72. Hence, when the unit is assembled and placed in operating position as the upper member 72 is screwed downwardly and the upper member 72 and lower member 78 become attached and then, the entire unit rotates and the threads in leg 40 are threadedly engaged with the threads 36 of stem 30. Continual rotation will cause the shut-off valve 14 to operate in the same manner as was described in connection with the embodiments depicted in FIGS. 1–7. A hose 86 can be coupled to the extension hollow member 88 via fitting 90 and the operator can turn the shut-off valve on and off obtain water or stop the flow of water. In this instance the worker may want to clean the parts of the sprinkler or alternatively the hose can be used to irrigate other areas, if desired. This is clearly depicted in FIG. 12 where the adapter mechanism 70 is connected to the shut-off valve 14 in the sprinkler system.

What has been shown by this invention is a simple and inexpensive shut-off valve adapted to be used in a sprinkler system so that individual sprinklers can be removed without shutting-off the flow of water to the entire system or zone in a system. The shut-off valve can be utilized with other fittings so that water can be obtained from a displaced sprinkler. It will be understood that while the invention did not include seals for the shut-off valve it is within the skill of an ordinary skilled person to include seals if leakage in the shut-off valve is a problem. Also, while the invention described in its preferred embodiment the stops being mounted on the outside of the shut-off valve housing, it also, is within the skill of an ordinary artisan to place the stop mechanism inside the shut-off valve housing. Moreover, valves other than the spherical valve depicted in the preferred embodiment can be utilized for the shut-off function.

As for example, and not to be deemed a limitation, a butterfly valve can be substituted for the spherical ball valve.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. The combination of a shut-off valve and case enclosed sprinkler in which the case enclosed sprinkler is at least one of a plurality of case enclosed sprinklers attached to a case enclosed sprinkler system that includes a pipe for flowing water from a source of water, the case enclosed sprinkler having a threaded portion on the bottom of said case enclosed sprinkler, the sprinkler system including a fitting attached to the pipe, the shut-off valve being independent of said case enclosed sprinkler and being mounted on the fitting intermediate a portion of the pipe and the case enclosed sprinkler and being threaded to said threaded portion of said case enclosed sprinkler so that the shut-off valve is operable to permit the flow of water from said pipe to said case enclosed sprinkler and to block the flow of water from said pipe into said case enclosed sprinkler, the removal of said sprinkler from said case enclosed sprinkler from said shut-off valve operates the shut-off valve to block the flow of water from said pipe to said case enclosed sprinkler and the insertion of said case enclosed sprinkler on said shut-off valve operates said shut-off valve to open said shut-off valve to flow water from said pipe to said case enclosed sprinkler.

2. The combination of a shut-off valve and case enclosed sprinkler in which the case enclosed sprinkler is at least one of a plurality of case enclosed sprinklers attached to a case sprinkler system as claimed in claim 1 wherein said shut-off valve has an infinite number of positions that changes the metering area of said shut-off valve for limiting the amount of flow of water from said pipe to said case enclosed sprinkler.

3. The combination of a shut-off valve and case enclosed sprinkler in which the case enclosed sprinkler is at least one of a plurality of case enclosed sprinklers attached to a case sprinkler system as claimed in claim 2 wherein said shut-off valve has a movable valve element for opening and blocking off the flow of water to and from said case enclosed sprinkler, a valve stem extending from said movable valve element and attaching mechanism on said valve stem being affixed to said sprinkler so that the movement of said case enclosed sprinkler for the insertion and removal thereof from the sprinkler system rotates said valve stem to move said movable valve element.

4. The combination of a shut-off valve and case enclosed sprinkler in which the case enclosed sprinkler is at least one of a plurality of case enclosed sprinklers attached to a case sprinkler system as claimed in claim 3 wherein said movable valve element is a hollow ball rotatably mounted in a valve housing and having at least one aperture that in a given position registers with the opening of said pipe for permitting the flow of water to said case enclosed sprinkler.

5. The combination of a shut-off valve and case enclosed sprinkler in which the case enclosed sprinkler is at least one of a plurality of case enclosed sprinklers attached to a case sprinkler system as claimed in claim 4 including another aperture formed in said ball that is diametrically opposed to said aperture to permit the flow of water in said pipe through said shut-off valve.

6. The combination of a shut-off valve and case enclosed sprinkler in which the case enclosed sprinkler is at least one of a plurality of case enclosed sprinklers attached to a case sprinkler system as claimed in claim 3 wherein said valve stem includes a pair of stop members attached to said valve stem to rotate therewith and a fixed stop carried by said valve housing operably connected to said pair of stop members to permit partial rotation of said valve stem.

7. The combination of a shut-off valve and case enclosed sprinkler in which the case enclosed sprinkler is at least one of a plurality of case enclosed sprinklers attached to a case sprinkler system as claimed in claim 6 wherein said stop members and said fixed stop are externally of said valve stem and valve housing respectively.

8. The combination of a shut-off valve and case enclosed sprinkler in which the case enclosed sprinkler is at least one of a plurality of case enclosed sprinklers attached to a case sprinkler system as claimed in claim 7 wherein said shut-off valve includes an inlet, a fitting attached to said inlet and end of said pipe to attach the shut-off valve to said pipe to permit the flow of water into said inlet adjacent to said valve element.

9. The combination of a shut-off valve and sprinkler in which said sprinkler is at least one of a plurality of sprinklers attached to a case sprinkler system that includes a pipe for flowing water from a source of water, said shut-off valve being mounted intermediate a portion of the pipe and said sprinkler so that the shut-off valve is operable to permit the flow of water from said pipe to said sprinkler and to block the flow of water from said pipe into said sprinkler, the removal of said sprinkler from said case enclosed sprinkler from said shut-off valve operates the shut-off valve to block the flow of water from said pipe to said sprinkler and the insertion of said sprinkler on said shut-off valve operates said shut-off valve to open said shut-off valve to flow water from said pipe to said sprinkler, said shut-off valve including a housing defining a cavity and an inlet and outlet communicating with said cavity, fitting means for attaching said inlet to said pipe, a valve element disposed in said cavity and a valve stem operably extending from said valve element, said sprinkler including a threaded member formed on the bottom of said sprinkler, said valve stem including a threaded end removably threaded to said threaded member, so that rotation of said sprinkler is fitted to said valve stem via the threads of said threaded member and threaded end so that removal of said sprinkler or insertion of said sprinkler to said valve stem operates said valve element to move from an opened to closed position and vice versa, and stop means on said valve stem to limit the amount of rotation of said valve stem.

10. The combination of a shut-off valve and sprinkler as claimed in claim 9 wherein said valve element includes a hollow ball valve, the flow of water being directed into said hollow portion of said ball valve through an aperture formed in said ball valve and into a central bore formed in said valve stem to communicate the flow of water from said pipe to said sprinkler.

11. An adapter mechanism in combination with a shut-off valve, said shut off valve affixed to a pipe of a sprinkler system for flowing water for irrigation purposes, said shut off valve including housing defining a cavity, a rotatable valve element in said cavity for flowing water to said adapter mechanism, a hollow valve stem carried by said valve element extending through said housing, said hollow valve stem including stop means mounted thereon for limiting the rotation of said valve stem, means for removably attaching said adapter mechanism to said hollow valve stem, said adapter mechanism including an elongated hollow extension portion having one end removably attached to said hollow valve stem to flow water therethrough, whereby rotation of said adapter mechanism rotates said hollow valve stem and said valve element to flow water through said extension and block water therefrom.

12. An adapter mechanism in combination with a shut-off valve as claimed in claim 11 wherein said valve element includes a hollow ball valve and said stop means includes a projection extending from said housing and a depending arm having opposing end surfaces bearing against said projection in opposite directions of rotation of said valve stem.

13. An adapter mechanism for replacing a water sprinkler that has been removed from a water sprinkler system in combination with a shut-off valve wherein said adapter mechanism includes an upper hollow cylindrical member and a lower hollow cylindrical member disposed in axial alignment adapted to engage said shut-off valve, a clutch mechanism mounted at the bottom of said upper hollow cylindrical member and at the top of said lower hollow cylindrical member so that when coupled said lower hollow cylindrical member is rigidly coupled to said upper hollow cylindrical member and rotation of said upper hollow cylindrical member positions said shut-off valve to an open and closed position and when said shut-off valve is in the open position water flows through said hollow of said upper hollow cylindrical member and said lower hollow cylindrical member.

14. The combination of a shut-off valve and case enclosed sprinkler in which the case enclosed sprinkler is at least one of a plurality of case enclosed sprinklers attached to a case enclosed sprinkler system that includes a pipe for flowing water from a source of water, the case enclosed sprinkler having a threaded portion on the bottom of said case enclosed sprinkler, the sprinkler system including a fitting attached to the pipe, the shut-off valve being independent of said case enclosed sprinkler and being mounted on the fitting intermediate a portion of the pipe and the case enclosed sprinkler and being threaded to said threaded portion of said case enclosed sprinkler so that the shut-off valve is operable to permit the flow of water from said pipe to said case enclosed sprinkler and to block the flow of water from said pipe into said case enclosed sprinkler, the movement in the direction to remove said sprinkler from said case enclosed sprinkler from said shut-off valve operates the shut-off valve to block the flow of water from said pipe to said case enclosed sprinkler and the movement of said case enclosed sprinkler in the direction toward the insertion thereof operates said shut-off valve to open said shut-off valve to flow water from said pipe to said case enclosed sprinkler.

* * * * *